United States Patent
Kaplan et al.

(10) Patent No.: US 7,043,263 B2
(45) Date of Patent: May 9, 2006

(54) SYSTEM AND METHOD FOR MOBILE CONFIGURATION

(75) Inventors: Diego Kaplan, San Diego, CA (US); Bilhan Kirbas, La Jolla, CA (US)

(73) Assignee: Kyocera Wireless Corp., San Diego, CA (US)

( * ) Notice: Subject to any disclaimer, the term of this patent is extended or adjusted under 35 U.S.C. 154(b) by 582 days.

(21) Appl. No.: 10/120,956

(22) Filed: Apr. 11, 2002

(65) Prior Publication Data

US 2004/0203941 A1 Oct. 14, 2004

(51) Int. Cl.
*H04M 3/00* (2006.01)

(52) U.S. Cl. ............... 455/466; 455/418; 455/419; 455/420; 455/517

(58) Field of Classification Search ........... 455/418, 455/419, 420, 517, 466
See application file for complete search history.

(56) References Cited

U.S. PATENT DOCUMENTS

| 6,029,065 | A | 2/2000 | Shah ................. 455/414 |
| 6,223,028 | B1 | 4/2001 | Chang et al. ......... 455/419 |
| 6,275,693 | B1 | 8/2001 | Lin et al. ............ 455/414 |
| 6,292,833 | B1 | 9/2001 | Liao et al. ........... 709/229 |
| 2002/0144151 | A1* | 10/2002 | Shell et al. ........... 713/201 |
| 2003/0186721 | A1* | 10/2003 | Kanazawa et al. ..... 455/552.1 |

* cited by examiner

*Primary Examiner*—Joseph Feild
*Assistant Examiner*—S. Smith

(57) ABSTRACT

A system and method for configuring, or provisioning, mobile communication devices 10 by an administrator 12. Administrator 12 comprises a computer, or second mobile 18. Mobile configuration feature codes are communicated to mobile 10 by communications channel 14 which can comprise RF wireless transmission over a mobile communication network. Feature codes are transmitted to mobile 10 by way of a Short Message System (SMS) or an Internet protocol-based Over-the-Air (IOTA) protocol.

19 Claims, 3 Drawing Sheets

SYSTEM AND METHOD FOR MOBILE CONFIGURATION

BACKGROUND OF THE INVENTION

1. Field of the Invention (Technical Field)

The present invention relates to mobile communication devices, in particular to configuring or reconfiguring a mobile by transmitting a configuration message from a mobile, or a computer, to the mobile to be configured.

2. Background Art

There are a variety of mobile communication devices available for wireless, or remote, communications, including mobile cellular and satellite telephones, pagers, personal digital assistants (PDAs), and the like. These devices typically comprise a rigid housing enclosing a printed circuit board, an associated microprocessor, electronic and electroacoustic components, and a portable power supply such as a battery. Mobile communication devices communicate through a variety of means, including antennas that transmit and receive radio frequency (RF) signals, infrared (IR) emitters and receivers, or cable connections to input/output ports of computers and other mobile devices. The user interfaces with the circuitry and microprocessor of the device through a keypad, or touchpad, located on the front outer surface of the housing. Keys on the keypad are pressed by the user to temporarily close an internal switch and send a signal to the microprocessor where an appropriate routine processes the input and operates the device. On mobile telephones, graphical elements, such as alphanumeric characters and icons, are located on or near the keys of the keypad to guide the user in interfacing with the mobile. A display on the housing of the device provides a readout of data input by the user, access to spatially navigated menu trees, includes a graphical user interface (GUIs), windows, and messages.

Mobile telephones in particular (hereafter referred to as "mobiles") are configured, or "provisioned", for various modes of operation. The configuration determines how basic functions of the mobile will operate, such as setting or resetting wireless voice and data exchange protocol parameters, parameters used to enable or disable communication features, and local network services available to the mobile. Examples of communication features include, but are not limited to, call forwarding, call waiting, caller identification, automatic callback, conference calling, message waiting notification, call encryption, voice mail, cost of call notification, enhanced vocoder (voice encoder), and the ability to transmit and receive textual messages. Mobiles are also configured so that communications occur through the appropriate service provider and are invoiced properly. A telephone number and a 34-bit binary mobile identification number (MIN) for analog communications, (international mobile subscriber identity (IMSI) for CDMA communications), used to identify a particular mobile subscriber within the mobile telephone communication network, are also configured into a mobile in a number assignment module (NAM) within non-volatile memory of the mobile. The NAM is also used to indicate whether the mobile functions in the personal communication service (PCS) band (1.9 GHz) or the cellular band (800 MHz). Other configuration information can include an electronic serial number (ESN), network identification (NID), system identification (SID), a home registration indicator, a preferred roaming list (PRL), and other information that allows the network base station to locate and determine the operating characteristics and capabilities of the mobile. The configuration can be preset in the mobile, set into the mobile upon entering an appropriate access code, or set after connection to the wireless carrier network through which the mobile operates.

Typically, the configuration is established after connection to the wireless carrier network, commonly referred to as over-the-air service provisioning (OTASP). (A specification for OTASP operation can be found in "Over-the-Air Service Provisioning of Mobile Stations in Spread Spectrum Systems", TIA/EIA/IS-683-A, incorporated herein by reference.) Local service parameters are acquired from and set by the carrier network via the over-the-air function/customer service center (OTAF/CSC) through a particular server, typically that of the communication service provider. The mobile requests configuration information from a network server and is then configured "over the air" in accordance with the information acquired from the server. The information obtained from the server is executable or binary code containing interfaces, data, and operational parameters that modify local service parameters to set or alter mobile functions, such as communication features, including whether the mobile will support cellular or personal communication service, dual-band or single band transmission, analog or digital transmission protocol, etc.

Users are not directly provided the information necessary to configure, or reconfigure, a mobile; however, most mobiles can be reconfigured by accessing a "hidden" menu within the mobile processor. To do so, the communications service provider must either contact the user, or subscriber, in order to instruct the user how to reconfigure the mobile, or the mobile must be taken to a service provider service center. The mobile cannot be reconfigured for a particular feature until the appropriate access code has been entered into the mobile to access the appropriate configuration menu. Particular communication features require a feature code in order to set or reset the feature.

Once configured, information is exchanged between mobiles or between mobiles and other devices such as computers via RF signals, or cable connections sometimes referred to as "connectivity kits". Wireless RF transmission provides the longest transmission range currently available and is often more flexible than cable transmission.

As mobile designs have advanced over time, more features are available to the user, such as the ability to program, store, and transmit data. Mobiles store contact information, for example, names, telephone numbers, addresses, e-mail addresses, web site addresses, and scheduling information such as meetings and appointments. Many mobiles are capable of transmitting textual data as well as voice information to other mobiles, computers, servers, or over the Internet by means such as short messaging systems (SMS), discussed below, and Internet protocol-based over-the-air configuration management (IOTA protocol).

In order to transmit data and text messages between mobiles or between mobiles and computers, servers, or the Internet, spatially navigated menus shown on the display are typically implemented to aid the user in inputting messages and data, and also to aid the user in accessing data for revision or transmission. To improve the efficiency of text message transmission between mobiles, a variety of SMS have been designed for rapid text entry. Early applications of SMS were used by telephone operators to alert subscribers to newly received voice mail messages or stored facsimiles by displaying a simple message on the mobile display that the user saw once the mobile was turned on. Later applications of SMS provide users with a list of default messages that are chosen by a single keystroke in order to be sent, for example, "please call home." Upon choosing the predefined message, the sending mobile would automatically send it to the receiving mobile. One advantage of an SMS is that it does not require the receiving mobile to be powered on in order to receive the message. The sent message is stored in the communication system until the receiving mobile is powered on. The message is then automatically received, stored on the receiving mobile, and displayed on the mobile display.

With increasing reliance on wireless communication, particularly via mobiles, it is desirable for individuals or organizations to be able to control the configuration of a particular mobile, and to be able to monitor the current configuration status of the mobile. Currently, mobiles are constrained by the service provider to the configuration provided under the service plan and can only be configured, or reconfigured, by the carrier network, or by accessing the appropriate configuration menu by secret code. If a mobile could be configured for particular features, communication efficiency would be greatly enhanced and communication costs minimized.

Accordingly, a method is needed whereby mobiles can be configured or reconfigured for particular features in a user-friendly manner. Ideally, the ability to configure mobiles would be accomplished over wireless means so that communication distance does not inhibit the process. Ideally, mobiles could be configured by a remote computer or by communication from a second mobile.

SUMMARY OF THE INVENTION
(DISCLOSURE OF THE INVENTION)

It is therefore a primary object of the present invention to directly configure a mobile with features selected by a user via another mobile or from a computer. Another primary object of the present invention is to enable the configuration status of a mobile to be retrieved from the mobile by communication from another mobile or a computer.

The present invention overcomes the limitations existing in the prior art by implementing a conventional SMS or IOTA protocol to configure and reconfigure features of mobiles.

A primary advantage of the present invention is that a mobile can be configured for selected features by another mobile or from a remote computer. Another advantage of the invention is that the current mobile configuration status can be retrieved by means of communication from another mobile or computer.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate preferred embodiments of the present invention and, together with the description, serve to explain the principles of the invention. The drawings are only for the purpose of illustrating preferred embodiments of the invention and are not to be construed as limiting the invention. In the drawings.

DESCRIPTION OF THE PREFERRED EMBODIMENTS

(BEST MODES FOR CARRYING OUT THE INVENTION)

The present invention is a method for configuring a mobile. The invention allows an administrator, operating independently yet within the parameters set by a carrier network, to use a SMS or an IOTA protocol to communicate feature codes to a mobile, as well as to retrieve the current configuration status of the mobile. As used herein the phrase "feature codes" refers to codes depicting a variety of communication features available to a typical mobile, including wireless voice and data exchange protocol parameters, parameters used to enable or disable communication features, and local network services available to the mobile. Such features may include but are not limited to: call blocking, call forwarding, call waiting, caller identification, automatic callback, conference calling, message waiting notification, call encryption, voice mail, cost of call notification, enhanced vocoder (voice encoder), and the ability to transmit and receive textual messages. Features also include such capabilities as whether the mobile can support cellular or personal communication service, IS 95 or CDMA 2000 modulation protocol, dual-band or single band transmission, analog or digital transmission protocol, etc. The term "administrator" as used herein refers to the device through which the user or individual within a business organization controls the configuration of a mobile. Such a device can include a second mobile or a computer.

Figure 1:
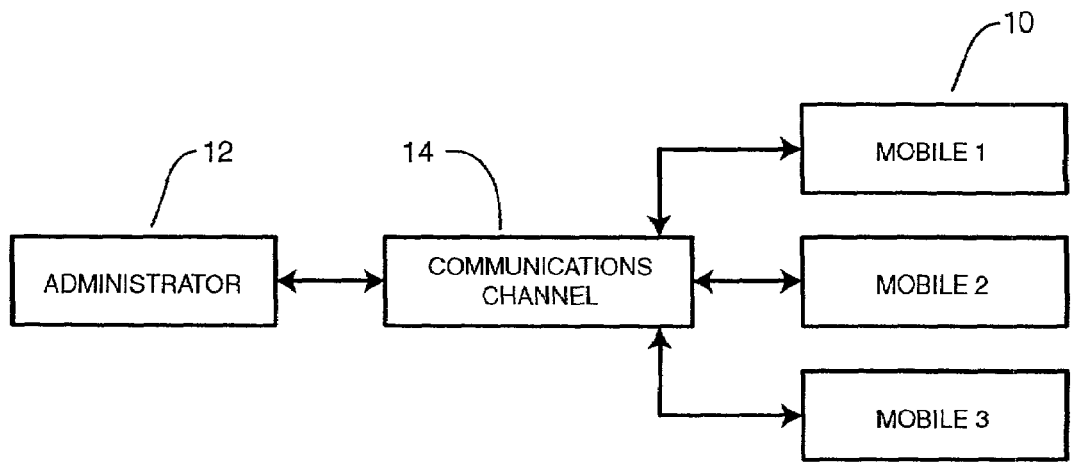
FIG. 1 is a block diagram illustrating a first embodiment of the present invention for configuring a mobile, depicting communication between a plurality of mobiles and an organization administrator.

Referring to FIG. 1, a block diagram depicts a first embodiment of the present invention. A plurality of mobiles shown generally at 10 used within an organization, such as a particular business environment, communicate with an organization administrator 12 through communications channel 14. Communications channel 14 can comprise RF or other wireless transmission means between mobiles 10 and administrator 12. Communications channel 14 can operate via the Internet Protocol (IP), Wireless Application Protocol (WAP), or other suitable transmission protocol. Preferably the communications channel is wireless, so that distance and flexibility of communication is maximized. In this system, administrator 12 operates as a mobile communications administrator for the organization, capable of communicating feature codes to mobiles 10 and retrieving configuration data from mobiles 10. It will be understood in this embodiment of the invention that administrator 12 comprises a computer, a server for a particular organization, or other equivalent device.

Figure 2:
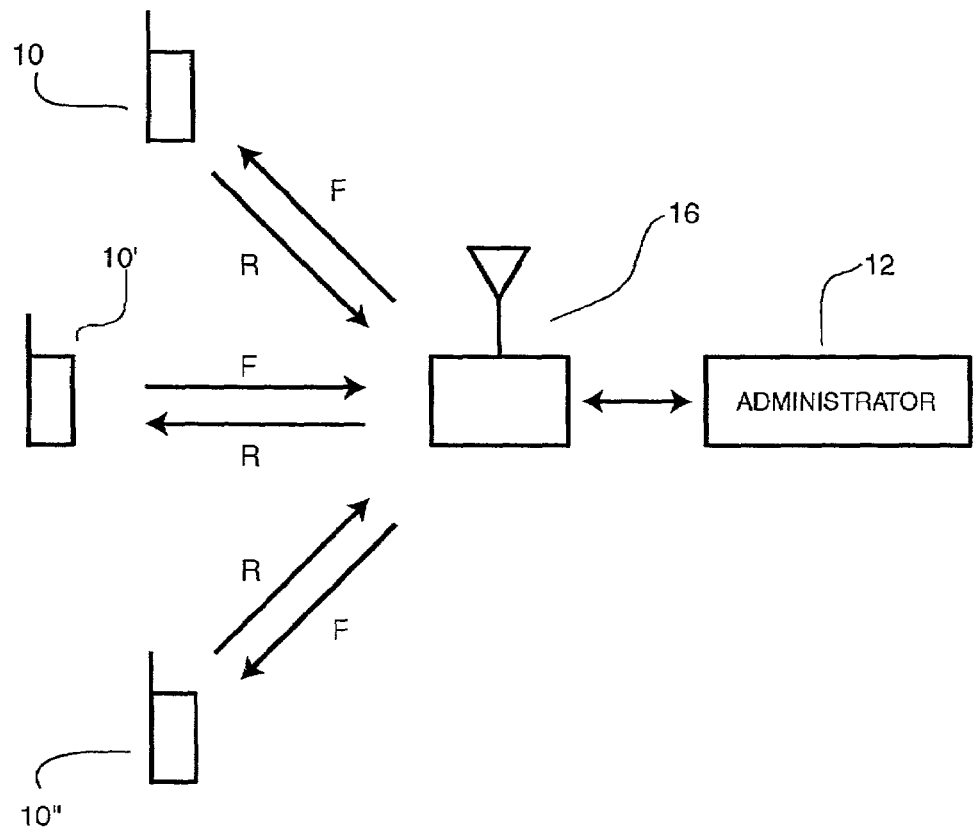
FIG. 2 is a diagram illustrating the embodiment of FIG. 1 operating in a cellular telephone communications network.

Referring to FIG. 2, a diagram illustrates a mobile cellular telephone communications system within which the first embodiment of the present invention can be implemented. Three mobiles 10, 10', and 10" are shown with a single base transceiver station 16 within a cellular communications site. A cell is generally defined as a particular RF coverage area. As a mobile changes location, it can move from one cell to the next if necessary to maintain communication. Base station 16 is a multicircuit transceiver located at the center of the cell whose primary purpose is to handle incoming and outgoing calls within the cell. Calls originating from a particular mobile are relayed through base station 16. All mobile communications occur through the base stations of each cell via RF transmission, as well as through a mobile telephone switching office (MTSO) computer that is in communication with each base station. Reverse channel link R represents RF communication from mobile 10 to base station 16, while forward channel link F represents RF communication from base station 16 to mobile 10, when mobile 10 is in operation. Transmission may occur in an analog mode, such as via advanced mobile phone service (AMPS), or a digital mode, such as code-division multiple access (CDMA) or time-division multiple access (TDMA) modulation techniques.

The present invention is preferably implemented within such a cellular telecommunications environment depicted in FIG. 2. Administrator 12 configures mobiles 10 via RF communication through base station 16. Mobile feature codes are encrypted into a message and transmitted to mobile 10 from administrator 12 in the forward link via base station 16. "Encrypt" will be understood herein to refer to incorporating the information into a message for transmission and need not necessarily mean that the information is somehow disguised to inhibit interception by a third party.

Figure 3:
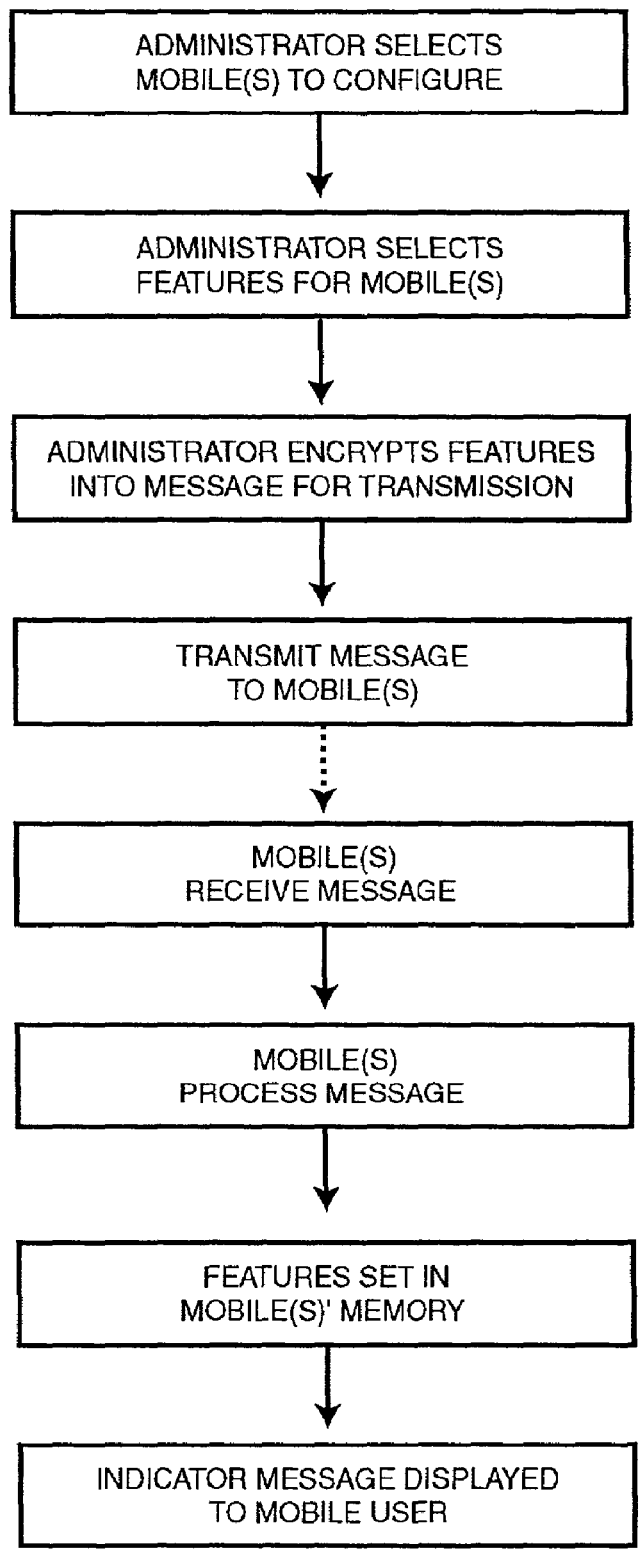
FIG. 3 is a flow diagram of the method of configuring a mobile according to the first embodiment of the present invention.

FIG. 3 is a flow diagram demonstrating the methodology of the first embodiment of the invention operating within the communications network of FIG. 2. In order to configure selected mobiles within the organization for particular features, the organization administrator 12 is preferably guided through the feature configuration process by a series of menus or other GUI. First, the mobile or mobiles 10 for which selected features are to be set are selected. Mobiles can be selected by telephone number, by MIN or IMSI, or any other appropriate designation. Then the feature or features are selected for the mobile 10. Once features are selected, the various feature codes are encrypted into a message by suitable software operating within administrator 12. The message preferably contains at least three identifying strings, including the mobile identifier (such as an MIN), a bit or bits to indicate to the mobile processor that features are to be set or reset, and the encrypted feature codes. The message is then transmitted to the receiving mobile or mobiles 10 by means of a SMS or IOTA protocol. Upon receiving the encrypted message, the receiving mobile 10 decrypts the message to indicate that feature codes are to be set or reset, and then processes the message and configures the mobile according to the feature codes by a suitable software routine operating in the mobile processor. Feature codes are then stored in non-volatile memory within mobile 10 until such time as another feature code message is received.

The process of receiving feature codes is therefore transparent to the mobile user. Optionally, the user is notified in the event that administrator 12 resets the features of mobile 10, by means of a message displayed on the mobile display, such as: "Feature codes have been reset. Please see updated list of available communication features."

The present invention further provides the ability to retrieve the current configuration status of mobile 10. First administrator 12 selects the mobile for which the configuration status is needed. A request for configuration status is then encrypted into a message for transmission to mobile 10 by a suitable software routine operating within administrator 12. The message preferably includes a string to indicate the receiving mobile identification, and a bit or bits to indicate to the mobile processor that the configuration status is requested. The message is then transmitted to the receiving mobile 10 over a mobile wireless communications channel via an SMS or IOTA protocol. Upon receiving the encrypted message, the receiving mobile decrypts the message to indicate that the configuration status is requested by way of a suitable software routine operating in the mobile processor. Mobile 10 then transmits a code indicating its current configuration through the reverse link via base station 16 to administrator 12 by means of a message in an SMS or IOTA protocol. This process is transparent to the mobile user; however, the user is optionally notified that the configuration status has been forwarded to administrator 12 by displaying a message on the mobile display.

The present invention is particularly suited for operation within an organization, such as within a particular business, to enhance communication efficiency and to reduce communication costs within an organization. The ability to program features of mobiles operating within the organization is limitless, however, examples include the ability to program a mobile to only receive telephone calls from a particular telephone number; to block the ability of the mobile to make "long distance" calls; to lock access to mobile operation except by means of a password; to program a lost mobile to only be able to dial a particular telephone number so that it can be returned to its proper owner; and other organization-specific parameters.

Figure 4:
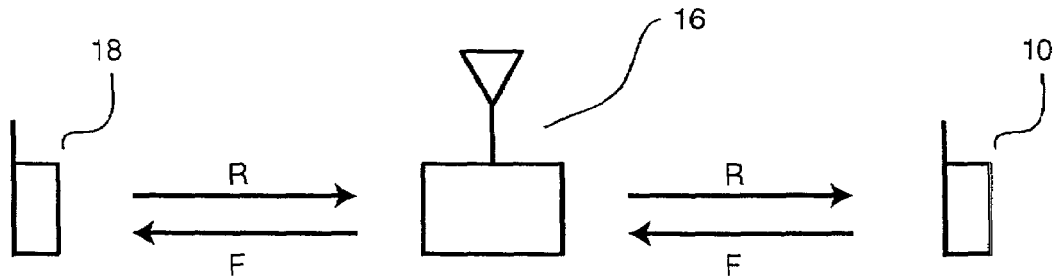
FIG. 4 is a block diagram illustrating a second embodiment of the present invention for configuring a mobile, wherein a second mobile operates as the administrator to configure the first mobile.

Referring to FIG. 4, a second embodiment of the present invention for configuring mobile 10 is shown. In this embodiment, mobile 10 is configured, or reconfigured, by way of an administrator comprising a second mobile 18. The second mobile 18 configures mobile 10 by communicating with mobile 10 via base station 16 in the same manner as described above with respect to the first embodiment. In this embodiment a user simply calls mobile 10 from mobile 18 in order to configure or to determine the configuration status of mobile 10, making this embodiment particularly convenient and efficient for a user. In this manner the user can remotely reconfigure mobile 10 without the need for contacting a service provider.

Figure 5:
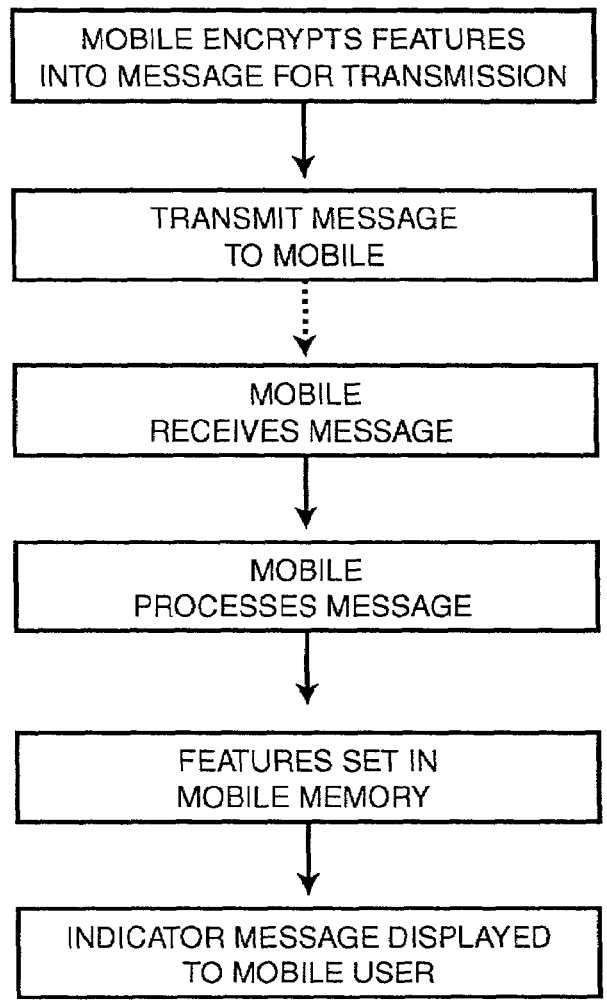
FIG. 5 is a flow diagram of the method of configuring a mobile according to the second embodiment of the present invention.

Referring to FIG. 5, a flow diagram demonstrates the methodology of the second embodiment of the invention operating within the communications network of FIG. 4. In order to configure mobile 10 for particular features, the user is preferably guided through the configuration process by a series of menus or other GUIs on mobile 18 operated by suitable software within the mobile processor. First, the user selects mobile 10 which is to be configured by telephone number, by MIN or IMSI, or any other appropriate designation. Then the user selects the feature or features for mobile 10. Once features are selected, the various feature codes are encrypted into a message by a suitable software routine operating within mobile 18. As in the first embodiment, the message preferably contains at least three identifying strings, including the mobile identifier (such as an MIN), a bit or bits to indicate to the receiving mobile processor that features are to be set or reset, and the encrypted feature codes. The message is then transmitted to the receiving mobile 10 over a wireless communications channel, such as the cellular telephone network depicted in FIG. 4, by means of an SMS or IOTA protocol. Upon receiving the encrypted message, the receiving mobile 10 decrypts the message to indicate that feature codes are to be set or reset, and then processes the message according to the feature codes, configuring mobile 10 accordingly. Feature codes are then stored in non-volatile memory within mobile 10 until such time as another feature code message is received. As in the first embodiment, the process of receiving feature codes is transparent to the user of mobile 10. Optionally, the user of mobile 10 is notified in the event that reconfiguration has occurred, by means of a message displayed on the display of mobile 10; for example: "This mobile can only call 555-1212. Please call now." In the second embodiment mobile 18 can retrieve the current configuration status of mobile 10 in a similar manner as described above with respect to the first embodiment.

Although the present invention can be implemented within a carrier network in a variety of ways, one suitable implementation requires subscription to a particular service plan from a service provider. The user, or business organization, would then retain the ability to program a mobile for certain features available within the service plan. It is to be understood that the present invention is not limited to operation within a cellular communications environment, or to RF communication, as will be understood by those skilled in the art.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of any references or publications cited above are hereby incorporated by reference.

What is claimed is:

1. A method of configuring a first mobile, the first mobile operating over a mobile communication system, the method comprising the steps of:
   utilizing a second mobile operating over the mobile communication system for encrypting a feature code into a configuration message;
   transmitting the configuration message from the second mobile to the first mobile over a mobile wireless communications channel of the mobile communication system;
   receiving the configuration message at the first mobile;
   decrypting the received configuration message at the first mobile; and
   configuring the first mobile according to the feature code received in the configuration message.

2. The method of claim 1 wherein the step of transmitting the configuration message to the first mobile comprises the step of: transmitting the configuration message from the second mobile to the first mobile utilizing a short messaging systems (SMS) protocol.

3. The method of claim 1 wherein the step of transmitting the configuration message to the first mobile comprises the step of: transmitting the configuration message from the second mobile to the first mobile utilizing an Internet over-the-air (IOTA) protocol.

4. The method of claim 1 wherein the step of encrypting a feature code comprises the step of: encrypting at least one feature code, a mobile identifier, and an indicator into the configuration message, the indicator for indicating that the at least one feature code is being transmitted to the first mobile in the configuration message.

5. The method of claim 1 further comprising the step of indicating to a mobile user on a mobile display that the mobile has been configured.

6. A method of retrieving mobile configuration status from a first mobile, the first mobile operating over a mobile communication system, the method comprising the steps of:
   utilizing a second mobile for encrypting a request message, the request message for requesting the mobile configuration status from the first mobile;
   transmitting the request message from the second mobile to the first mobile over a mobile wireless communications channel of the mobile communication system;
   receiving the request message at the first mobile;
   decrypting the received request message at the first mobile; and
   transmitting the mobile configuration status from the first mobile to the second mobile in a response message over a second mobile wireless communications channel.

7. The method of claim 6 wherein the step of transmitting the request message to the first mobile comprises the step of: transmitting the request message from the second mobile to the first mobile utilizing a short messaging systems (SMS) protocol.

8. The method of claim 7 wherein the step of transmitting the mobile configuration status from the first mobile to the second mobile comprises the step of: transmitting the mobile configuration status from the first mobile to the second mobile utilizing the short messaging systems (SMS) protocol.

9. The method of claim 6 wherein the step of transmitting the request message to the first mobile comprises the step of: transmitting the request message from the second mobile to the first mobile utilizing an Internet over-the-air (IOTA) protocol.

10. The method of claim 9 wherein the step of transmitting the mobile configuration status from the first mobile to the second mobile comprises the step of: transmitting the mobile configuration status from the first mobile to the second mobile utilizing the Internet over-the-air (IOTA) protocol.

11. The method of claim 6 wherein the step of encrypting a request message comprises the step of: encrypting a mobile identifier and an indicator into a request message, the indicator for indicating that the mobile configuration status is requested in the request message.

12. A system for configuring a second wireless device, the system comprising:
    a mobile wireless communications network;
    a first wireless device comprising software means for encrypting a mobile feature code into a configuration message for transmission over the mobile wireless communications network to the second wireless device; and
    the second wireless device comprising:
       software means for decrypting the mobile feature code from the configuration message; and
       configuration means for configuring the second wireless device according to the mobile feature code.

13. The system of claim 12 wherein the configuration message is transmitted utilizing an SMS protocol or an IOTA protocol.

14. The system of claim 13 wherein the configuration message comprises at least one feature code, a mobile identifier, and an indicator that the at least one feature code is being transmitted to the second wireless device.

15. The system of claim 12 wherein the first wireless device further comprises second software means for encrypting a request for mobile configuration status into a request message for transmission over the mobile wireless communications network to the second wireless device.

16. The system of claim 15 wherein the request message is transmitted utilizing an SMS protocol or an IOTA protocol.

17. The system of claim 16 wherein the request message comprises a mobile identifier and an indicator that the mobile configuration status is requested.

18. The system of claim 12, wherein the second wireless device is operating in a first modulation protocol, and the mobile feature code transmitted in the configuration message indicates a second modulation protocol, wherein the configuration means of the second wireless device configures the second wireless device to operate in the second modulation protocol.

19. The system of claim 12, wherein the mobile feature code transmitted in the configuration message is an analog transmission protocol or a digital transmission protocol, and wherein the configuration means of the second wireless device configures the second wireless device to operate in the analog transmission protocol or the digital transmission protocol.

* * * * *